United States Patent [19]

Kawakita et al.

[11] Patent Number: 4,661,773
[45] Date of Patent: Apr. 28, 1987

[54] METHOD OF AND APPARATUS FOR MAGNETICALLY DETECTING THE THREE-DIMENSIONAL ROTATIONAL POSITION AND MOVEMENT OF AN OBJECT

[75] Inventors: Kazuaki Kawakita; Makio Higuchi, both of Fukuoka, Japan

[73] Assignee: Nippon Seiko Kabushiki Kaisha, Tokyo, Japan

[21] Appl. No.: 288,115

[22] Filed: Jul. 29, 1981

[30] Foreign Application Priority Data

Mar. 19, 1981 [JP] Japan .................................. 56-38726

[51] Int. Cl.⁴ ........................ G01B 7/14; G01R 33/12; G01R 33/06
[52] U.S. Cl. .................................... 324/208; 324/247; 324/251; 73/462; 338/32 H; 340/672
[58] Field of Search ............... 324/207, 208, 244, 251, 324/247, 377, 223, 252, 243, 233–235, 209, 260, 261; 340/670, 671, 672, 686, 687, 862; 338/32 H; 73/460, 461, 462

[56] References Cited

U.S. PATENT DOCUMENTS

| | | | |
|---|---|---|---|
| 2,938,163 | 5/1960 | Roffman et al. | 324/232 |
| 3,183,434 | 5/1965 | Auer | 324/377 X |
| 3,611,345 | 10/1971 | Pintell | 324/207 |
| 3,820,012 | 6/1974 | Molyneux | 324/377 |
| 3,906,339 | 9/1975 | Leisterer | 324/208 |
| 4,340,886 | 7/1982 | Boldt et al. | 340/686 |
| 4,373,271 | 2/1983 | Nitz | 324/260 X |

FOREIGN PATENT DOCUMENTS

| | | | |
|---|---|---|---|
| 2403167 | 5/1979 | France | 324/207 |
| 1069673 | 6/1963 | United Kingdom . | |
| 0530250 | 9/1976 | U.S.S.R. | 324/208 |

Primary Examiner—Gerard R. Strecker
Assistant Examiner—Warren S. Edmonds
Attorney, Agent, or Firm—Shapiro and Shapiro

[57] ABSTRACT

A magnetic axis is imparted to an object which effects three-dimensional rotational movement. The magnetosensitive semiconductor elements are disposed in the directions of three axes or two axes of a space determined for the object in such a manner that the elements are not in contact with the object. Any variation in direction of the magnetic axis resulting from movement of the object is detected by the magnetosensitive semiconductor elements. The detection signals from the magnetosensitive semiconductor elements are electrically processed so that the three-dimensional rotational position and movement of an object may be detected without contact and continuously.

3 Claims, 8 Drawing Figures

METHOD OF AND APPARATUS FOR MAGNETICALLY DETECTING THE THREE-DIMENSIONAL ROTATIONAL POSITION AND MOVEMENT OF AN OBJECT

BACKGROUND OF THE INVENTION

1. Field of the Invention

This invention relates to a method of detecting the position and movement of an object which effects three-dimensional rotational movement.

2. Description of the Prior Art

Where, in mechanical apparatus, measuring or control apparatus or the like, it has been necessary to three-dimensionally detect the moving conditions of a certain member which effects three-dimensional rotational movement, for the purpose of movement analysis, control and performance, the conventional method has generally found it very difficult to detect three-dimensional movement although it has been capable of detecting two-dimensional movement. Particularly, many problems have been encountered where the member to be detected is not directly visible or lies in a narrow space. For example, where the movement of the rolling members of an antifriction bearing which effect three-dimensional rotational movement, particularly, the movement of the balls of a ball bearing, is to be detected, there has been a method comprising forming a mark on the balls and photographing the movement of this mark, whereas to carry out such method, it has been necessary to cut part of the retainer and there has also been a fear that the movement of the balls become different from their normal conditions and in addition, even if part of the retainer is cut, it has been impossible to completely pursue the mark of the balls and thus, detection of the movement of the balls has been incomplete. Also, in a detection method utilizing electromagnetic induction or other methods, it has been impossible to detect the three-dimensional rotational movement of the balls continuously without affecting the movement of the balls.

SUMMARY OF THE INVENTION

The present invention has for its object to detect the three-dimensional rotational position and movement of an object without contact and continuously, and consists in a method which comprises imparting a magnetic axis to an object to be detected, sensing the direction of the magnetic axis of the object and any variation in direction of the magnetic axis resulting from three-dimensional rotational movement by means of magnetosensitive semiconductor elements, processing the signals from the magnetosensitive semiconductor elements and detecting the three-dimensional rotational position and movement of the object irrespective of stationary or moving conditions.

The invention will become fully apparent from the following detailed description thereof taken in conjunction with the accompanying drawings.

DESCRIPTION OF THE PREFERRED EMBODIMENTS

Figure 1:
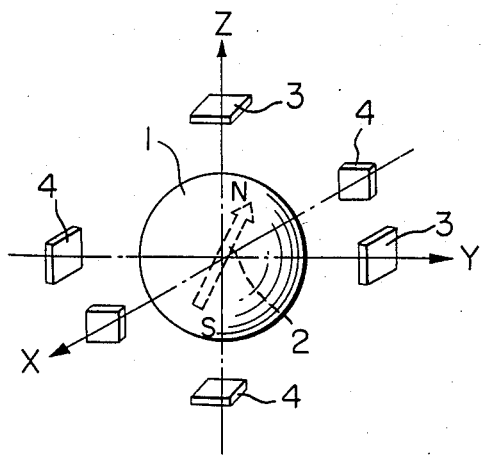
FIG. 1 is a schematic view for illustrating the principle of the method of the present invention.

The principle of the present invention will hereinafter be described by reference to FIG. 1. Designated by 1 is an object to be detected which effects three-dimensional movement. The object 1 is provided with a magnetic axis 2 by magnetizing the object 1 or by attaching a magnet to the object 1. If three axes of a suitable space, i.e., X-axis, Y-axis and Z-axis, are determined for the object 1 and a set of two magnetosensitive semiconductor elements 3 and 4 is disposed on each of said axes without being in contact with the object 1 and an electric circuit and display device for detecting the electrical outputs of these magnetosensitive semiconductor elements 3 and 4 are installed, any variation in direction of the magnetic axis 2 resulting from the three-dimensional rotational movement of the object 1 may be detected as a variation in electrical output by the pair of magnetosensitive semiconductor elements 3 and 4 and this may be recorded on a recording device. The movement of this object can be detected without contact and yet continuously, and by arranging two or more of the magnetosensitive semiconductor elements as a set in opposed relationship, the detection sensitivity can be increased while, at the same time, the increase or decrease in output of the magnetosensitive semiconductor elements resulting from coaxial movement of the object 1, namely, movement of the object toward and away from the magnetosensitive semiconductor elements, can be offset and averaged so that only the rotational movement can be accurately detected without any error.

Figure 2A:
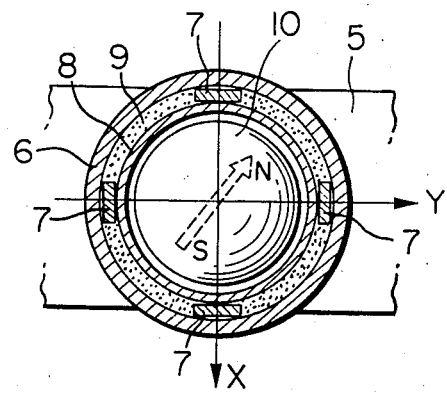
FIGS. 2 and 3 show an embodiment of the present invention, FIG. 2A being a front view of a ball bearing having a ball whose movement is to be detected, FIG. 2B being a plan view thereof, and FIG. 3 being a schematic, partly cross-sectional view of the device for detecting the movement of the balls of a ball bearing incorporated in an apparatus.
Figure 2B:
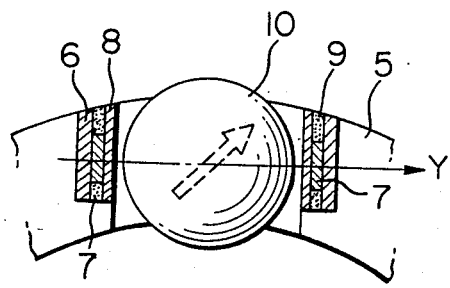

FIGS. 2A and 2B show a first embodiment of the present invention which is concerned with the detection of three-dimensional rotational movement of balls in a ball bearing, and the outer and the inner race of the ball bearing are not shown in these Figures. A sensitivity-improving ring 6 formed of a magnetic material is fitted in the pocket hole of the retainer 5 of this ball bearing to decrease leakage of magnetism, and inside the sensitivity-improving ring 6, a set of two magnetosensitive semiconductor elements 7 is disposed in opposed relationship on each of the X-axis and the Y-axis, and a protective ring 8 formed of the same material as the retainer 5 is attached to the inside of the elements 7, all these being secured by an adhesive agent 9. If a ball 10 provided with a magnetic axis NS having, for example, a residual magnetic flux of the order of several gauss is placed as the object into the protective ring 8, there will be provided a normal contact condition between the ball and the retainer pocket hole and the movement of the ball will hardly be hampered by the magnetic axis, and the angle of inclination of the magnetic axis NS of the ball with respect to the X-axis and the Y-axis can be efficiently sensed by the magnetosensitive semiconductor elements 7 through the provision of the sensitivity-improving ring 6, so that the outputs of the magnetosensitive semiconductor elements 7 can be electrically processed to detect the movement of the ball which is the object to be detected.

A second embodiment, which will be described next, is concerned with a method of detecting the three-dimensional rotational movement of a magnetized ball 11 (FIG. 3) as an object to be detected which is incorporated in a bearing. Reference numeral 12 designates the inner race of the ball bearing, reference numeral 13 denotes the outer race of the ball bearing, and reference numeral 14 designates the retainer of the ball bearing. The inner race 12 of this ball bearing is mounted on a shaft 15, and the outer race 13 is fitted to a housing 20.

The housing 20 comprises chiefly an outer housing 21 and an inner housing 22 both formed of a magnetic material, and a magnetosensitive semiconductor element 23 is provided between the outer and the inner housing, as shown, the outer housing 21 and the inner housing 22 being coupled together by adhesive or by soldering with a connecting plate 24 of nonmagnetic material interposed therebetween. The magnetosensitive semiconductor element 23 must be mounted at at least three circumferential locations. Magnetosensitive semiconductor elements 30 are provided at symmetrical positions in the pocket of the retainer 14 of the ball bearing, and a holding frame 31 is attached to the left portion of the retainer 14 as viewed in FIG. 3, and a hollow cylindrical member 32 is installed on the holding frame 31. Slip rings 33 are provided on the hollow cylindrical member 32, and brushes 34 are disposed in contact with the slip rings 33, with lead wires 35 being connected between the slip rings 33 and the magnetosensitive semiconductor elements 30. Reference numeral 36 designates an amplifier connected to the brushes 34 through conductors, reference numeral 37 denotes an oscilloscope, and reference numeral 38 designates an oscillograph. Although not shown, design is made such that a predetermined weak current is applied to each magnetosensitive semiconductor element.

In the above-described apparatus, by rotation of the shaft 15, the ball 11 moves as the inner race 12 rotates, and the movement of the ball 11 of this ball bearing can be detected as a variation in direction of the magnetic axis 40 by the magnetosensitive semiconductor elements 23 and 30.

Figure 3:
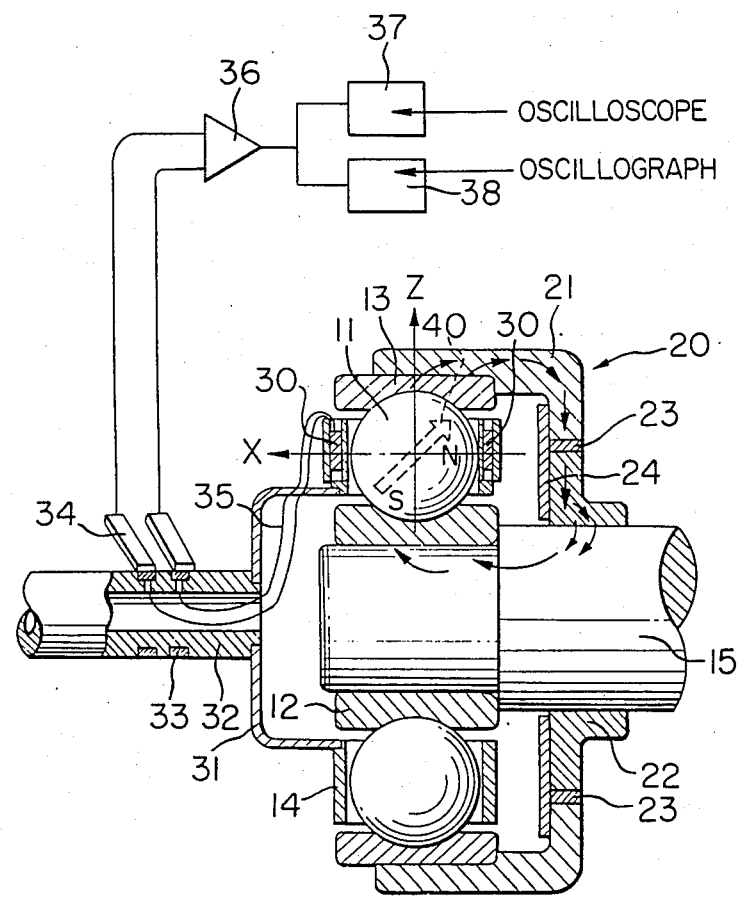

That is, the angle of inclination of the magnetic axis 10 of the ball 10 with respect to the X-axis in FIG. 3 is detected by the magnetosensitive semiconductor element 30, the output of which is directed by the lead wires 35 to the slip rings 33 attached to the hollow cylindrical member 32, and then is transmitted to the brushes 34, and is amplified by the amplifier 36, and is thereafter displayed by the oscilloscope 37 or recorded on the oscillograph 38.

On the other hand, the angle of inclination of the magnetic axis 40 with respect to the Z-axis in FIG. 3 can be detected by sending any variation in magnetic field by the magnetosensitive semiconductor element 23 provided in the housing 20. In this case, the magnetic field by the magnetic axis 40 forms a magnetic path as indicated, for example, by arrows in FIG. 3. At whatever position on the circumference of the inner race 12 the ball 11 may lie, if three or more magnetosensitive semiconductor elements 23 are mounted circumferentially, the magnetic flux density can be detected efficiently and without irregularity, and the combined output from the magnetosensitive semiconductor elements 23 can be suitably amplified and recorded by the recording device or displayed by the display device.

Figure 4:
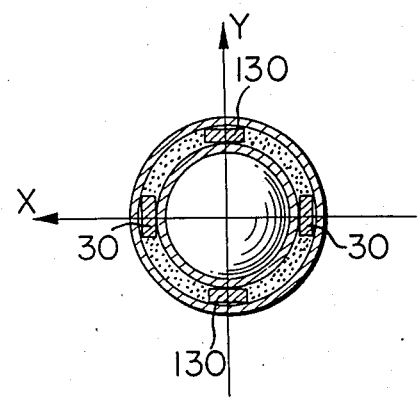
FIG. 4 is an end view taken along line X of FIG. 3.

The angle of rotation of the ball 11 with respect to the Y-axis can be detected in a manner similar to the case of the aforedescribed X-axis, Y-axis magnetosensitive semiconductor elements 130 being shown in FIG. 4.

Figure 5:
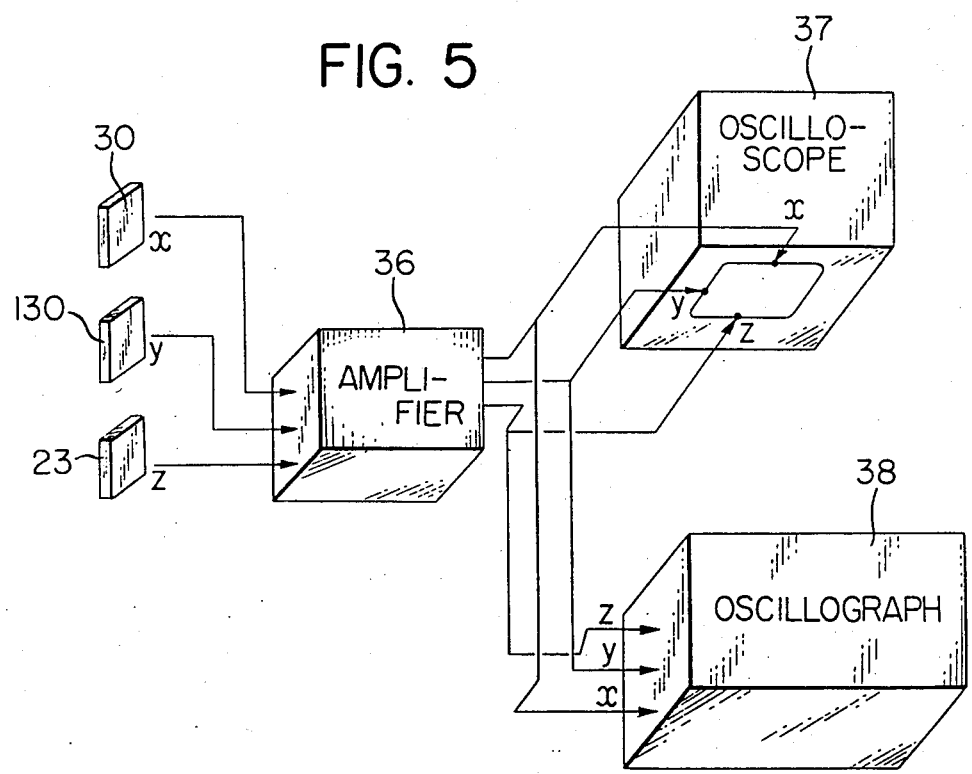
FIG. 5 shows the arrangement of an electrical processing apparatus.

FIG. 5 shows typical semiconductor elements 23, 30, and 130 connected in an electrical processing system including amplifier 36, oscilloscope 37, and recording oscilloscope (oscillograph) 38.

Figure 6:
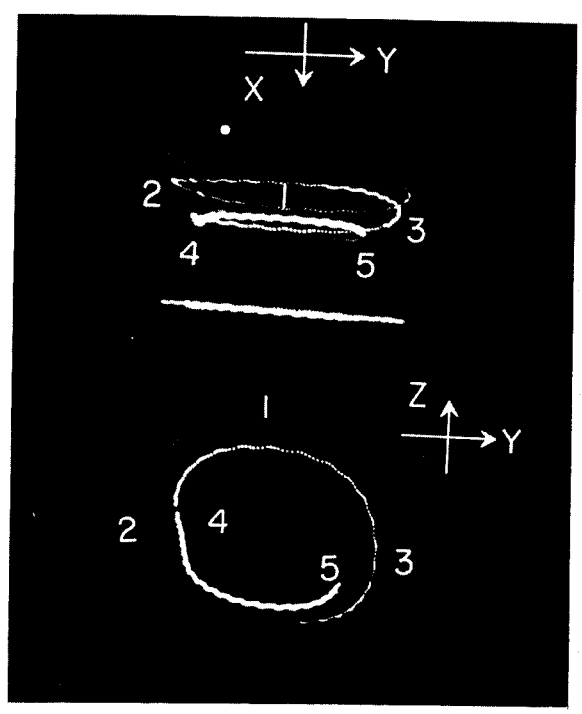
FIG. 6 is a photograph in which the three-dimensional rotational movement of the ball is sensed as the movement of a point on a spherical surface by the method of the present invention.

FIG. 6 illustrates the three-dimensional rotational movement of the ball in the above-described embodiment explicitly as the movement of a single point by the third angle projection system. That is, it is a figure in which the detection signals from the magnetosensitive semiconductor elements disposed on the X-axis and the Y-axis are electrically processed and combined and the locus of the combined point thereof is depicted in the fashion of a plan view on the oscilloscope while, at the same time, the detection signals from the magnetosensitive semiconductor elements disposed on the Y-axis and the Z-axis are likewise combined and the locus thereof is depicted in the fashion of an elevational view, and the horizontal line in the Figure shows the base line in the third angle projection system.

The locus of the spatial movement of these combined points shows the movement of the N pole of the magnetic axis in the electrically combined spherical plane corresponding to the spherical surface of the ball and thus, the rotational movement of the ball can be three-dimensionally seen by eyes.

Figure 7:
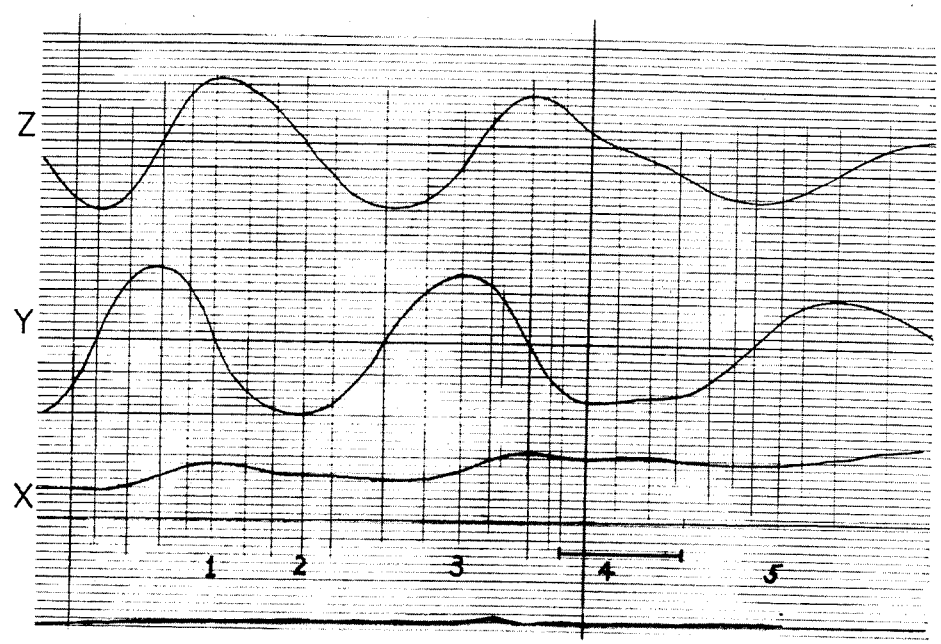
FIG. 7 is a graph obtained by recording the variation with time in movement of the ball on an oscillogram.

FIG. 7 is a graph obtained by electrically processing the detection signals from the magnetosensitive semiconductor elements disposed on the X-axis and the Y-axis in the abovedescribed embodiment, and recording the variation with time in movement of the ball on the oscillogram, and the symbols in FIG. 7 show the correspondences to the spatial positions in FIG. 6.

In this manner, the direction of rotation and the variation with time in rotation in the three-dimensional rotational movement of the ball of the ball bearing can all be detected and recorded.

According to the detection method of the present invention, even in a condition under which the object to be detected is in slow motion or at rest which could not heretofore be detected by the use of an electromagnetic coil, the position or displacement of the object can be reliably detected, and the detection is not affected even in vacuum or even if oil film adheres to the object, and thus, accurate detection is ensured.

Also, in the detection method of the present invention, the magnetic axis imparted to the object to be detected may be weak and the movement of the object is hardly hampered by the magnetic axis and thus, natural moving conditions of the object can be reliably detected.

Moreover, detection of the three-dimensional rotational movement of an object lying in a narrow space or in a directly invisible place which has heretofore been impossible or very difficult has become possible. Also, in the detection of movement, very small magnetosensitive semiconductor elements can be disposed in a very narrow space and thus, there is little or no spatial limitation and movement of the object is not hampered under non-contact conditions and even remote detection is possible, and this means a wide range of actual application. The present invention can be immediately applied to the detection and control of the movements of various apparatus and moving parts which effect three-dimensional movement, for example, the arm motions of gyroscopes and industrial robots, and is also applicable to the control of the attitude of rockets in space or space satellites. Also, the present invention is a detection method which can be utilized for the inspection of rotary members, antifriction bearings, etc. which require high accuracy and high performance. That is, the present invention is a detection method whose very effective utilization can be effected in the field of measurement control.

We claim:

1. A method of detecting the three-dimensional rotational position and movement of a ball that is one of a plurality of balls of a ball bearing having inner and outer races with a retainer holding said balls between said races, comprising imparting to said one ball a magnetic axis of know predetermined direction relative to said one ball, supporting magnetosensitive semiconductor elements on said retainer along two substantially orthogonal axes passing through said one ball, supporting said ball bearing for rotation of the inner race relative to the outer race about an axis of rotation, disposing a plurality of magnetosensitive semiconductor elements at positions spaced circumferentially about said axis of rotation, magnetically coupling the last-mentioned magnetosensitive semiconductor elements to said one ball for sensing magnetic flux of said one ball along an axis that passes through said one ball substantially orthogonal to the previously-mentioned orthogonal axes, rotating said inner race relative to said outer race, whereby said balls rotate, and detecting, by signals from said magnetosensitive semiconductor elements, variations in the direction of said magnetic axis relative to said orthogonal axes.

2. Apparatus for detecting the three-dimensional rotational position and movement of a magnetized ball that is one of a plurality of balls of a ball bearing having inner and outer races with a retainer holding said balls between said races, said magnetized ball having a magnetic axis of known predetermined direction relative thereto, said apparatus comprising means including magnetosensitive semiconductor elements supported on said retainer along two substantially orthogonal axes passing through said magnetized ball for detecting the direction of said magnetic axis with respect to said two axes, means supporting said ball bearing for rotation of said inner race relative to said outer race about an axis of rotation, whereby said balls may rotate, and means including a plurality of magnetosensitive semiconductor elements disposed at positions spaced circumferentially about said axis of rotation and magnetically coupled to said magnetized ball for detecting the direction of said magnetic axis with respect to an axis substantially orthogonal to the previously mentioned orthogonal axes.

3. Apparatus in accordance with claim 2, wherein said ball bearing supporting means includes a shaft on which the inner race of the ball bearing is mounted and a housing on which the outer face of the ball bearing is mounted, said circumferentially spaced magnetosensitive semiconductor elements being supported on said housing and being magnetically coupled to said magnetized ball through said housing and said shaft.

* * * * *